(12) United States Patent  
Ribeiro

(10) Patent No.: US 9,248,465 B2  
(45) Date of Patent: Feb. 2, 2016

(54) PAINTING DEVICE

(75) Inventor: Carlos Ribeiro, Ho Chi Minh (VN)

(73) Assignee: OERLIKON SURFACE SOLUTIONS AG, TRUBBACH, Trubbach (CH)

( * ) Notice: Subject to any disclaimer, the term of this patent is extended or adjusted under 35 U.S.C. 154(b) by 0 days.

(21) Appl. No.: 14/240,096

(22) PCT Filed: Aug. 9, 2012

(86) PCT No.: PCT/EP2012/003399  
§ 371 (c)(1),  
(2), (4) Date: Apr. 17, 2014

(87) PCT Pub. No.: WO2013/026535  
PCT Pub. Date: Feb. 28, 2013

(65) Prior Publication Data  
US 2014/0238294 A1 Aug. 28, 2014

(30) Foreign Application Priority Data  
Aug. 22, 2011 (DE) .................... 10 2011 110 802

(51) Int. Cl.  
*B05B 15/12* (2006.01)  
*B05C 11/00* (2006.01)  
*B05C 15/00* (2006.01)  
*B05B 15/04* (2006.01)

(52) U.S. Cl.  
CPC ............. *B05B 15/1214* (2013.01); *B05B 15/04* (2013.01); *B05B 15/1225* (2013.01); *B05C 11/00* (2013.01); *B05C 15/00* (2013.01); *Y10S 901/43* (2013.01)

(58) Field of Classification Search  
None  
See application file for complete search history.

(56) References Cited

U.S. PATENT DOCUMENTS

2013/0118689 A1* 5/2013 Okuda ........................ 156/378

FOREIGN PATENT DOCUMENTS

| DE | 31 17 392 A1 | 12/1982 |
| DE | 295 20 824 U1 | 4/1996 |
| EP | 1 132 186 A1 | 9/2001 |
| EP | 1 964 617 B1 | 9/2008 |

OTHER PUBLICATIONS

International Search Report for PCT/EP2012/003399 dated Dec. 5, 2012.

* cited by examiner

*Primary Examiner* — Dah-Wei D Yuan  
*Assistant Examiner* — Jethro M Pence  
(74) *Attorney, Agent, or Firm* — Pearne & Gordon LLP

(57) ABSTRACT

The invention relates to a painting system which comprises a painting device (121) in the painting chamber (103), said painting device comprising a casing (113) that surrounds the workpiece support (107) such that paint droplets that are not deposited onto the workpieces are dripped onto the casing to a large extent and can thus be reused.

7 Claims, 2 Drawing Sheets

PAINTING DEVICE

The present invention relates to a painting facility for workpieces placed in a workpiece holder.

As a general rule, painting facilities are based on spraying techniques. In this respect, the paint to be applied is sprayed by means of a nozzle in the form of small droplets onto the workpiece to be painted. After the paint has been sprayed, the latter is dried. In many cases, a curing of the paint, for example in the form of a hardening/crosslinking, subsequently takes place. The "fog" that is generated in the vicinity of the workpiece during spraying of the paint is difficult to suppress, if may even be unpreventable. This has the consequence on the one hand that a large proportion of the used paint is diffused not onto the workpiece but in the surroundings. The quantity of material required per workpiece for the painting is thus correspondingly higher, in order to prevent the paints, which are usually not environmentally friendly, and possibly their solvents from escaping unhindered into the environment, such painting facilities are placed in a painting chamber. The paint droplets then travel at most up to the chamber wall, where they are deposited. This however means that the chamber walls have to be cleaned at regular intervals, which as a rule is time-consuming and results in an interruption in the production.

For many years, painting facilities were operated manually. Nowadays, fully automated painting facilities predominate. In this respect, the painter's former task of directing the nozzle during the painting process is usually performed by robots. Nowadays, inline production lines are particularly attractive, in which the workpiece holders equipped with the workpieces to be painted are led into the painting chamber by means of a transport facility, whilst at one station before the painting chamber the workpieces are prepared for being painted in an analogous workpiece holder, for example cleaned, and at a station after the painting chamber the workpieces that have just been painted are post-processed, e.g. dried and if necessary cured.

Set against this background, it would be desirable to have an improved painting facility that enables the material input of the paint to be strongly reduced and the frequency of the cleaning cycles of the painting chamber to be decreased. This constitutes the basis for the task of the present invention.

According to the invention, this task is solved in that within the painting chamber itself, during the painting process a casing surrounding the workpiece holder and with the inventive geometry is provided. On the one hand, it is coupled to a gas net device provided in the painting chamber and on the other hand it engages in the workpiece holder in such a manner that the gas flow introduced by the gas net device is directed inside the casing past the components of the workpiece holder fitted with workpieces and carries with it to a large extent paint drops that are not deposited onto the workpieces. By means of filtering, the paint droplets that are carded along are collected and used again for painted. Those paint droplets that are not carried with the gas flow will be deposited to a large extent onto the inside walls of the casing. This results in the drops accumulating on the surface and finally draining off, similar to a windowpane exposed to the rain. According to the invention, this draining paint can be collected in a catch vessel and subsequently be used again for painting. Due to the casing, little in the way of paint material will and on the walls of the painting chamber. The casing is designed in such a manner that it can easily be removed out of the painting chamber. It is thus easy to clean the casing and, due to the recovery of the paint, is less frequently necessary anyway.

In a preferred embodiment of the present invention, the inside diameter of the casing tapers below the area that is close to the workpieces to be painted. As a consequence, wherever the flow rate increases, those paint droplets that have missed the workpieces, are carried more efficiently with the gas flow.

In a further preferred embodiment of the present invention, the casing can be placed in the painting chamber in a movable manner so that once the workpiece holder has been inserted into the painting chamber, the casing can be "put over" the essential components of the workpiece holder and, after the painting process, the casing can then release the workpiece holder.

The invention will now be described in more detail on the basis of examples and with the aid of the figures.

Figure 1:
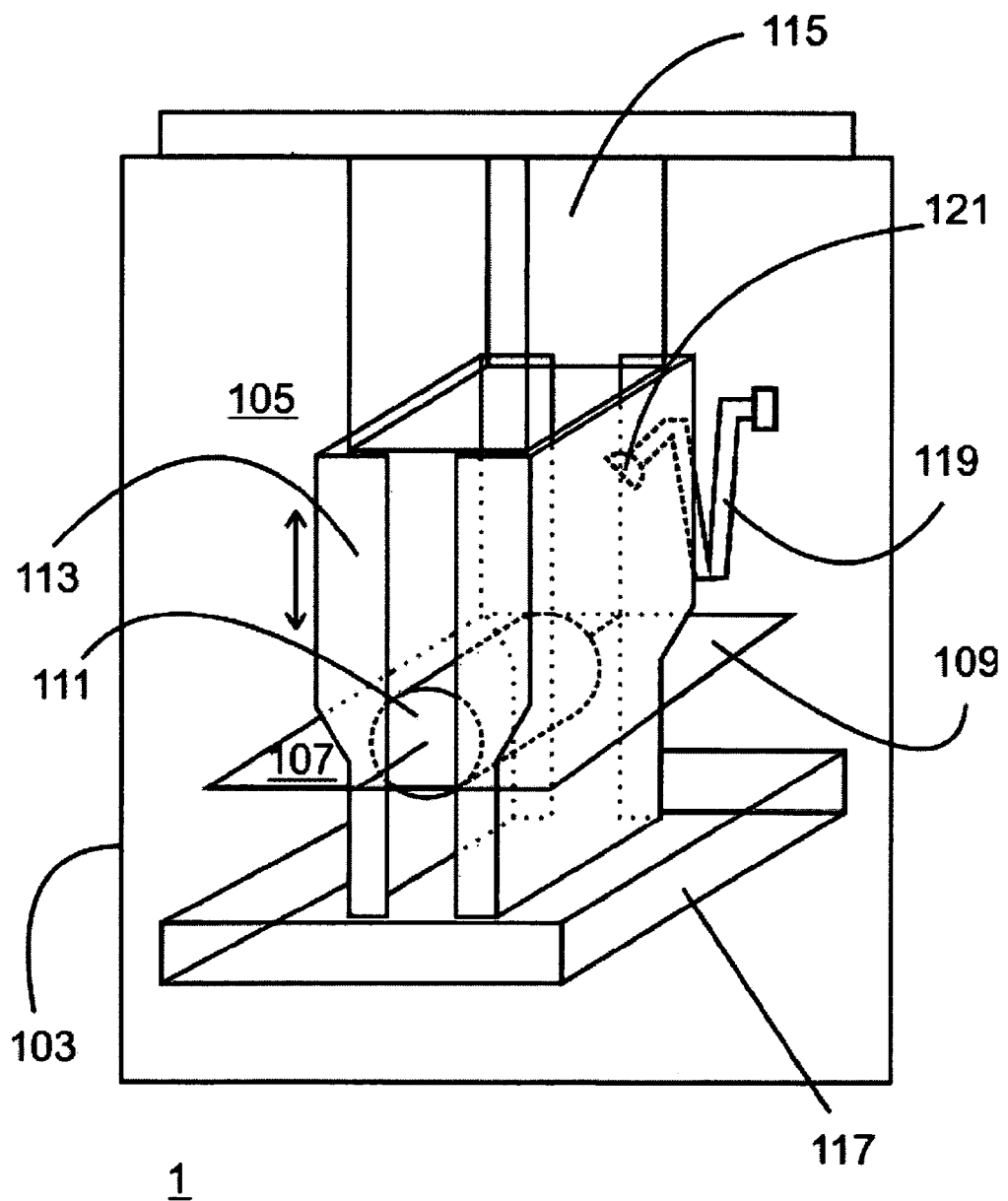
FIG. 1 shows an inventive painting device.

FIG. 1 represents a painting facility 101 with a painting chamber 103 and a painting device 105. The painting device 105 includes a workpiece holder 107 with a frame 109 onto which a spindle 111 is fastened in rotation, wherein the spindle 111 bears the workpieces to be painted (not shown). The painting device 105 furthermore comprises a casing 113 that can be displaced upwards and downwards by means of a driver (not shown), as indicated by the arrow. The painting device 105 furthermore comprises a gas net arrangement 115 and a catch vessel 117. Furthermore, the painting device according to the present embodiment comprises a painting robot 119 with a paint nozzle 121.

Figure 2:
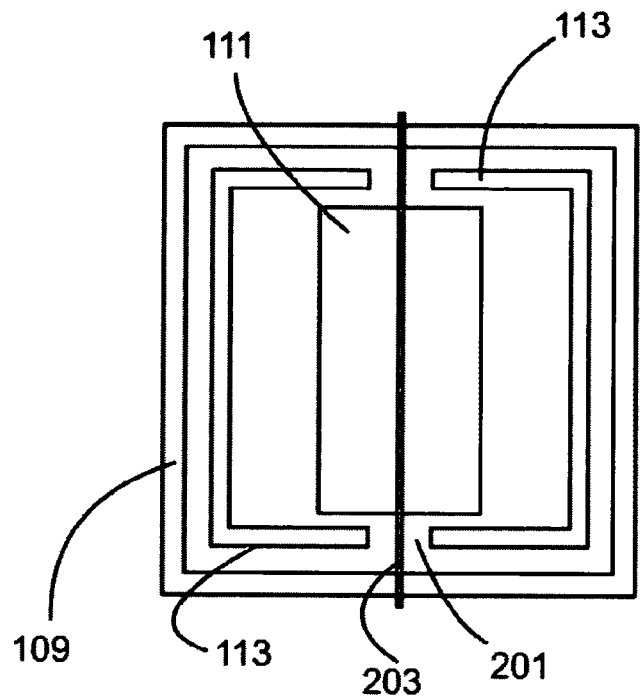
FIG. 2 shows a view from above of how, according to one embodiment of the present invention, the casing engages in the workpiece holder.

In order to paint the workpieces, a workpiece holder 107 is placed in the painting chamber 103 by means of a transport device (not shown), while the casing 113 is in a raised position. Subsequently, the casing 113 is lowered so that it encloses the spindle 111. In the present embodiment given by way of example, the casing 113 is then placed between the frame 109 and the spindle 111. FIG. 2 shows a cross section in a view from above of the corresponding situation. The spindle 111 is placed on the frame 109 by means of the shaft 203. The casing 113 comprises slits 201 open towards the bottom, so that it is possible to place the casing between the frame 109 and the spindle 111.

Figure 3:
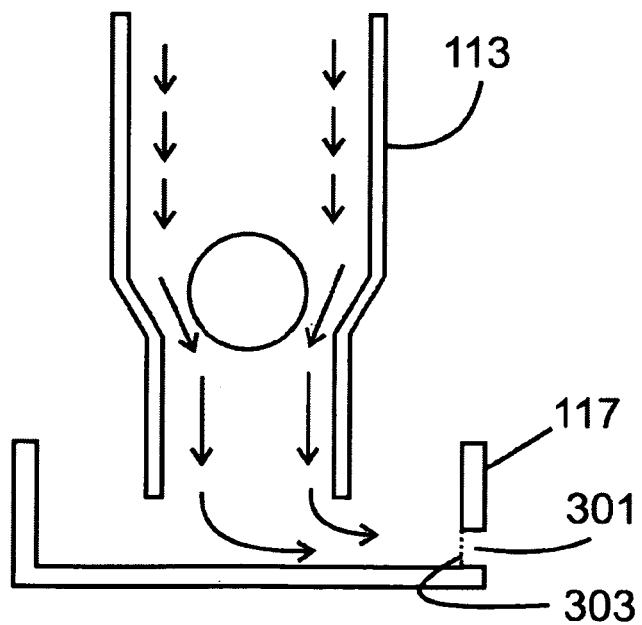
FIG. 3 shows in a side view a section through a workpiece holder together with the inventive casing according to a preferred embodiment as well as the flow conditions prevailing there.

Through the gas net arrangement 115, a gas flow is then established, wherein the gas flows through the inside of the casing 113 past the spindle and to the catch vessel 117. FIG. 3 shows the corresponding flow conditions, wherein short arrows indicate a low flow rate and long arrows a high flow rate. The catch vessel 117 contains a gas outlet 301 through which the gas is removed. This gas outlet 301 contains a paint filter 303 that filters out the paint droplets contained in the gas flow and directs them to the catch vessel 117.

Subsequently, the spindle 111 fitted all around with the workpieces to be painted is made to rotate and the painting robot is moved through the slits 201 into the inside of the casing 113 and the painting process is started. After completion of the painting process, the casing 113 is again raised and the painted goods can be moved out of the painting chamber.

Some paints on a solvent basis have solvents that are so volatile that the recovery over the catch vessel is not worthwhile without any further measures, as the paint will have already dried out too quickly there. According to a further preferred embodiment of the present invention, a solvent is added to the gas flow, preferably in a saturation concentration so that a "drying out" of the paint in the catch vessel is not possible due to the already saturated atmosphere.

What is claimed is:

1. Coating facility (101) comprising a painting chamber (103) that is placed in a painting device (105), wherein the painting device (105) comprises a painting robot (119) and a workpiece holder (107) holding at least one workpiece (111) wherein the painting device (105) comprises a movable casing (113) and the workpiece holder (107) comprises a frame (109) and a workpiece mount (111), wherein the casing (113) is placed during the painting process between the frame (109) and the workpiece mount (111), characterized in that the casing (113) is configured to move in the painting chamber (103) at least in the vertical direction in such a manner that the casing (113) is placed in at least a first raised position and a second lower position, so that while the casing (113) is placed in the first position the workpiece holder (107) is placed in the painting chamber (103), and once the workpiece holder (107) has been placed in the painting chamber (103), the casing (113) is lowered from the first position and placed in the second position, so that the casing (113) is put over the essential components of the workpiece holder (107) and placed between the frame (109) and the workpiece mount (111) in such a manner that the casing (113) encloses the workpiece mount (111), and the casing (113) is removed from the second position after the painting process in such a manner that the casing (113) releases the workpiece holder (107) and is moved back to the first position.

2. Coating facility according to claim 1, characterized in that the painting device (105) includes a gas inlet arrangement (115) so that during the painting process, a gas flow flowing through the inside of the casing (113) is applied to the workpieces.

3. Coating facility according to claim 2, characterized in that the casing (113) has a tapering, allowing the flow rate of the gas flow to be increased and the paint droplets generated through the painting process to be carried along.

4. Coating facility according to claim 1, characterized in that the painting device (105) comprises a catch vessel (117) in such a way that the paint collecting on the casing (113) and dripping from the casing (113) runs into the catch vessel (117) and be fed to a recovery system.

5. Coating facility according to claim 2, characterized in that in the coating facility, a supply of solvents is provided in such a way that a solvent is added to the gas introduced in the inside of the casing through the gas inlet arrangement that prevents the paint from drying on the walls of the casing and/or in the catch vessel.

6. Coating facility according to claim 1, characterized in that the painting robot is connected to a paint nozzle with a movable arm.

7. Coating facility according to claim 6, characterized in that the casing comprises a plurality of slits, wherein the paint nozzle is movable by the painting robot through at least one of the slits.

* * * * *